United States Patent Office 3,631,022
Patented Dec. 28, 1971

3,631,022
METHOD OF EXTRACTING NUCLEIC ACID FROM ACTIVATED SLUDGE
Mitsuo Kuriyama and Syozo Nishikawa, Yokohama-shi, Japan, assignors to Kurita Water Industries Ltd., Higashi-ku, Osaka-shi, Japan
No Drawing. Filed May 22, 1969, Ser. No. 827,060
Int. Cl. C07d 51/50
U.S. Cl. 260—211.5 R    10 Claims

ABSTRACT OF THE DISCLOSURE

Nucleic acid can be obtained at a low cost and high yield from activated sludge by a simple method which comprises extracting the nucleic acid contained in the mucilage of activated sludge by treating the activated sludge with an aqueous solution of chelating agents and separating the nucleic acid from the extract by precipitation.

BACKGROUND OF THE INVENTION

(a) Field of the invention

The present invention relates to a method of obtaining nucleic acid from activated sludge, which comprises extracting the nucleic acid from activated sludge by the use of a chelating agent as an extracting agent and separating the nucleic acid from the extract by precipitation.

(b) Description of the prior art

In the conventional methods of extracting the polymerized nucleic acid from a living micro organism, it is necessary first of all to break down its cell wall since the polymerized nucleic acid usually exists in the inner part of a cell. In doing so, such severe methods, either chemical or physical, as heat treatment, acid or alkali treatment, autolysis, ultrasonic treatment and the like are practiced, which methods, require complicated and unfavourable operations.

In the present method, activated sludge is used as a raw material, so the nucleic acid can be extracted without requiring such a severe method as mentioned above.

SUMMARY OF THE INVENTION

The inventors have found that approximately 50%, at least, of the nucleic acid contained in activated sludge, which was formed during sewage treatment, existed as the mucilage of activated sludge in an easily extractable form. With close attention given to this fact we made researches concerning methods for extracting the nucleic acid, and as a result we discovered that the nucleic acid contained in the mucilage of activated sludge can be extracted easily by the use of a chelating agent as an extracting agent, and thus made the present invention.

According to this invention there is provided a method of obtaining the nucleic acid from activated sludge, which comprises, extracting the nucleic acid contained in the sludge by treating activated sludge with an aqueous solution of chelating agents and separating the nucleic acid from the extract by precipitation.

Activated sludge which is used in this invention is formed during the process of the activated sludge method applied to the treatment of domestic sewage and industrial waste. Activated sludge may be dehydrated or not be dehydrated before use; however, generally speaking it is advisable to use it after it has been dehydrated. If the activated sludge formed by the activated sludge process in sewage treatment is used as the activated sludge material, the material is very low in cost and this also saves the labor hitherto required for its disposal, which is a great industrial advantage. As for the activated sludge, a sludge to which has been added a substantial quantity of metallic salts such as calcium chloride, iron chloride and the like as a coagulant at the time of the dehydration treatment for the purpose of disposal, is not favourable for this purpose.

The quantity of the nucleic acid contained in activated sludge changes according to seasonal conditions, variation in the kind of the sewage, the operating conditions of the sewage treatment plant, etc.; however, in the case of standard treatment, activated sludge of domestic sewage contains approximately 2–4% deoxyribonucleic acid (DNA) and 6–8% ribonucleic acid (RNA) on a dry basis. A considerable portion of the nucleic acid contained in said activated sludge exists in the form of mucilage of activated sludge and it can be easily extracted by the use of a chelating agent as an extracting agent.

In this invention, a chelating agent is used as an extracting agent. As the chelating agent, it is desirable to use those agents which have a high chelate stability constant, especially amino polycarboxylic acids which have a radical of the formula

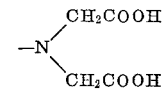

and amino polyphosphonic acids of the formula

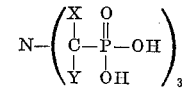

(where X and Y represent hydrogen or lower alkyl group respectively) are desirable and, above all, EDTA (ethylenediaminetetraacetic acid), NTA (nitrilotriacetic acid) and amino trimethylphosphonic acid are superior in extractability.

It is one of the excellent characteristics of the present invention that the extracting process can be conducted under mild conditions without requiring severe treatments in which heat, strong acid and strong alkali are used.

Usually, the concentrated solid matters contained in activated sludge are obtained by the use of a centrifugal separator or similar machine. The concentrated solid matters are suspended in an aqueous solution of approximately 1–5% chelating agent to conduct the extraction. It is desirable to use activated sludge which has been admixed with an organic solvent, for instance, methyl alcohol, ethyl alcohol, acetone, etc., before the extraction process, since such procedure prevents protein from getting mixed in the extract. The extraction should be conducted at the pH value in the neutral or alkali regions, preferably adjusting the pH at 10 or thereabout, and it should not be kept in the region of strong acidity. Nucleic acid can be easily precipitated and separated from the extract by adding an organic solvent to the extract thus obtained or by acidifying the extract. Methyl alcohol, ethyl alcohol and acetone are used as an organic solvent. The organic solvent may be used alone; however, its effect can be increased by the addition of such neutral salts as common salt. In acidifying the extract, an acid is added to the extract and hydrochloric acid, etc. are usually used. The acid may be used alone; however, the addition of neutral salts such as magnesium chloride increases the effect of the acid.

According to the present invention, nucleic acid can be obtained from inexpensive materials by a single method with a higher yield, therefore, the present method is extremely advantageous and has industrial importance as a method of obtaining nucleic acid.

In the extraction process of nucleic acid contained in activated sludge the present invention has many advantages, which are as follows:

(1) It requires no process of breaking down the cell wall of living micro organism.
(2) It prevents the denaturation or deproduction of nucleic acid during the extracting process because it requires no strong chemical treatment or heat treatment.
(3) The use of a chelating agent as an extracting agent protects the extracted nucleic acid from enzymatic degradation.

The process according to the present invention will be further illustrated by the following examples; however, this invention is not intended to be limited by them.

EXAMPLE 1

Activated sludge (containing nucleic acid consisting of 6.85% RNA and 3.25% DNA on a dry basis) collected at the municipal sewage treatment plant was suspended in 70% ethyl alcohol for 30 minutes, the alcoholic component was eliminated from the suspension by centrifugation, and the activated sludge thus obtained was used as a raw material for extracting nucleic acid.

3 g. of the material on a dry basis was suspended in 300 ml. of 1% EDTA (ph 10) aqueous solution and was left alone for 3 hours. Thereafter the suspension was centrifuged to obtain an extract. After common salt had been added to the extract in such an amount to make 0.5% concentration, ethyl alcohol in an amount twice the quantity of the extract was added to it and thus a mucilagenous precipitate was obtained. In the extracting procedure, the activated sludge was treated with ethyl alcohol promptly after its collection at the sewage treatment plant and the whole extracting procedure was conducted by keeping the sludge solution at a temperature of 4° C. For control purposes *Escherichia coli* at a logarithmic phase (containing nucleic acid consisting of 10.02% RNA and 4.15% DNA on a dry basis) was treated by the use of the same process as that of activated sludge to obtain a precipitate.

Table 1 shows the yields of nucleic acid obtained from the respective materials on a dry basis. In the said table, columns A show the yield (percent) of the total nucleic acid contained in the extract of the used material on a dry basis roughly estimated from the ultraviolet absorption spectrum at 260 m$\mu$ and columns B show respectively the yield (percent) of the nucleic acid, contained in the precipitate obtained by extracting with ethyl alcohol on a dry basis determined by means of fractionation according to the method of Schmidt, Thanhauser and Schneider.

TABLE 1

|  | Activated sludge | | *Escherichia coli* | |
|---|---|---|---|---|
|  | A | B | A | B |
| RNA |  | 2.45 |  | 0.18 |
| DNA |  | 1.25 |  | 0 |
| DNA + RNA | 5.95 | 3.70 | 1.37 | 0.18 |

It has been made clear from Table 1 that, when *Escherichia coli* is used, about 9.7% of the total nucleic acid contained in the cells is extracted, of which the percentage of nucleic acid which transfers into the precipitate fraction, or polymerized nucleic acid, is only 1.27% of said total nucleic acid. And DNA is scarcely extracted. In the case of activated sludge, however, as much as 59% of the nucleic acid contained in the sludge is extracted and approximately 62% of the extracted nucleic acid transfers into the precipitate and thus is obtained in the form of polymerized nucleic acid. About one-third of the polymerized nucleic acid is DNA. Taking into consideration the fact that activated sludge used as a raw material contains approximately 31% inorganic material, it will be more clearly understood that the quantity of nucleic acid obtained from activated sludge is very large. Incidentally, when the pH value is 9 at the time of extraction, the yield of nucleic acid obtained in the form of precipitate on the sludge on a dry basis is approximately 2.4%, and as the pH value at the time of extraction is lowered towards 7, the yield decreases.

When the precipitate is obtained by adding ethyl alcohol to the extracts prepared by the use of EDTA, said precipitate contains a large quantity of protein and a small quantity of polysaccharide besides said acid; however, these necessary components can be eliminated by means of a well-known method (such as treatment with an enzyme or detergent) according to the purpose of their respective usage. If it is necessary to separate DNA from RNA, they can be separated by means of a well-known method, too.

The activated sludge used as a material should not contain too much of metallic salt such as calcium chloride, iron chloride and the like added thereto.

When calcium chloride is added to activated sludge beforehand in excess of EDTA equivalent in molar weight, nucleic acid is scarcely extracted from activated sludge in the extraction process by the use of EDTA (pH 10).

EXAMPLE 2

Activated sludge (equal to 6 g. on a dry basis) collected from the municipal sewage treatment plant was concentrated with a centrifugal separator (operated at 3,000 r.p.m. for 10 minutes) and the resultant concentrated sludge was suspended in 300 ml. of tap water. An equal quantity of a 2% EDTA (pH 7.5) solution was added to this sludge suspension and the extract was obtained by means of a centrifugal separator (15,000 r.p.m. for 20 minutes) after the sludge suspension had been left alone at room temperature for 4 hours. By adding common salt to the extract to obtain 0.5% solution and further adding ethyl alcohol in an amount two times as much as the extract the precipitate was obtained. The yield of DNA on the material sludge was 1.15% and the yield of RNA was 2.51%.

EXAMPLE 3

The material sludge was prepared by concentrating activated sludge (equivalent to 10 g. on a dry basis) formed in the activated sludge process of treating phenol containing waste water by the use of the centrifugal separator (3,000 r.p.m. for 10 minutes). The material sludge was suspended in 1000 ml. of 1% EDTA (pH 10) solution, was left alone for 5 hours, and was centrifuged (12,000 r.p.m. for 20 minutes) to obtain an extract. 2% of $MgCl_2 \cdot 6H_2O$ was added to the extract and the pH was adjusted to 2.0 with the addition of hydrochloric acid to precipitate nucleic acid. The yield of DNA on the original sludge was 0.92%, and the yield of RNA was 2.10%.

EXAMPLE 4

The material sludge was prepared by concentrating activated sludge (equivalent of 10 g. on a dry basis) formed in the activated sludge process of treating phenol containing waste water by means of a centrifugal separator (3,000 r.p.m. for 10 minutes). The concentrated sludge was suspended in 80% ethyl alcohol for 5 hours and then the alcoholic component was eliminated with the centrifugal separator (3,000 r.p.m. for 10 minutes). After the material sludge thus prepared was suspended in 1000 ml. of 1.5% trisodium salt of NTA (nitrilotriacetic acid) solution and left alone at a room temperature for 5 hours, the suspended solution was centrifuged (13,000 r.p.m. for 20 minutes) to obtain an extract. 2% of $MgCl_2 \cdot 6H_2O$ was added to the extract and the pH of the extract was adjusted at 2.0 by adding hydrochloric acid to precipitate nucleic acid. The yield of DNA on the material sludge was 0.80%, and the yield of RNA was 1.92%.

EXAMPLE 5

Activated sludge collected at a municipal sewage treatment plant was centrifugally separated (3,000 r.p.m. for 10 minutes). Sludge equivalent to 10 g. on a dry basis was suspended in 500 ml. of tap water, to which 500 ml.

of 2% amino trimethylphosphonate solution (pH 8.5) was added, and after having been thoroughly stirred, the solution was left at room temperature for 8 hours to obtain an extract.

To the extract obtained from the above-mentioned sludge suspension by the use of a centrifugal separator (10,000 r.p.m. for 15 minutes) was added $MgCl_2 \cdot 6H_2O$ to obtain 1% solution whose pH was then adjusted at 2.0 with hydrochloric acid, and thus nucleic acid was precipitated. The yield of DNA on the material sludge was 0.86%, and the yield of RNA was 2.3%.

What we claim is:

1. A method of recovering nucleic acid from activated sludge obtained from municipal or industrial, activated sludge-type, waste treatment procedures, which consists essentially of treating said activated sludge with an aqueous solution of chelating agent, at a pH of about 7 or higher, to obtain an aqueous extract containing nucleic acid, said chelating agent being selected from the group consisting of (1) aminopolycarboxylic acids having a radical of the formula

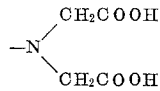

and (2) aminopolyphosphonic acids of the formula

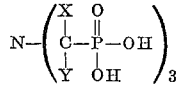

in which X and Y each is hydrogen or lower alkyl, and then precipitating nucleic acid from said extract.

2. A method according to claim 1, wherein said activated sludge is treated with an organic solvent before said sludge is treated with said chelating agent.

3. A method according to claim 1, wherein said chelating agent is selected from the group consisting of EDTA, NTA and amino trimethylphosphonate.

4. A method according to claim 1, wherein said pH is about 10.

5. A method according to claim 1, wherein nucleic acid is precipitated from said extract by adding an organic solvent to said extract.

6. A method according to claim 5, wherein said organic solvent is selected from the group consisting of methyl alcohol, ethyl alcohol and acetone.

7. A method according to claim 5, wherein neutral salt is also added to said extract with said organic solvent.

8. A method according to claim 1, wherein nucleic acid is precipitated from the extract by adding acid to said extract.

9. A method according to claim 8, wherein said acid is hydrochloric acid.

10. A method according to claim 8, wherein neutral salt is also added to said extract with said acid.

References Cited

UNITED STATES PATENTS

| | | | |
|---|---|---|---|
| 2,379,912 | 7/1945 | Laufer | 260—211.5 |
| 2,387,040 | 10/1945 | Redfern | 260—211.5 |

LEWIS GOTTS, Primary Examiner

J. R. BROWN, Assistant Examiner